(12) United States Patent
Maeda et al.

(10) Patent No.: US 6,728,480 B1
(45) Date of Patent: Apr. 27, 2004

(54) CASING WITH IMPROVED DRAIN HOLE

(75) Inventors: Haruo Maeda, Tsushima (JP); Kenichi Maruyama, Okazaki (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 10/383,136

(22) Filed: Mar. 6, 2003

(51) Int. Cl.[7] .............................................. G03B 17/08
(52) U.S. Cl. ........................ 396/25; 396/427; 396/535; 348/373
(58) Field of Search ............................ 396/25, 27, 535, 396/427; 220/4.02, 664; 324/156; 362/546, 547; 348/373, 374

(56) References Cited

U.S. PATENT DOCUMENTS 4,733,335 A * 3/1988 Serizawa et al. ........... 362/503
5,982,140 A * 11/1999 Toya et al. .................. 320/110
6,203,182 B1 * 3/2001 Hasegawa et al. .......... 362/547

FOREIGN PATENT DOCUMENTS

JP          03282526 A * 12/1991 ........... G03B/17/02

* cited by examiner

Primary Examiner—David M. Gray
(74) Attorney, Agent, or Firm—Koda & Androlia

(57) ABSTRACT

A casing for encasing equipment installed outdoors, such as a monitoring camera, includes a bottom having a drain hole formed through the bottom. The drain hole includes a first part and a second part having a larger inner diameter than the first part. The second part is open at an underside of the casing.

3 Claims, 4 Drawing Sheets

CASING WITH IMPROVED DRAIN HOLE

BACKGROUND OF THE INVENTION

1. Field of the Invention

This invention relates to a casing which encases equipment such as a monitoring camera and has a drain hole.

2. Description of the Related Art

Equipment installed outdoors, for example, a monitoring camera, usually includes a protective casing encasing an equipment body. Such a casing is waterproofed so that rain water can be prevented from penetration or entrance into the casing through fastening screws, connectors for power supply cables or control signal cables, or the like. Furthermore, the casing has a drain hole formed in the bottom thereof in anticipation of deterioration of packing or the like due to outdoor service for a long period of time and resultant penetration of rain water into the casing.

However, the conventional drain hole has a drain passage which has substantially a uniform inner diameter as shown in FIG. 3. As a result, rain water flows through the drain hole into the casing when pelting against the bottom of the casing together with strong winds such as in a typhoon or rainstorm, or when subjected to a strong wind while flowing along the surface of the casing toward the bottom.

SUMMARY OF THE INVENTION

Therefore, an object of the present invention is to provide a casing having a drain hole which can prevent rain water from penetrating therethrough into the interior of the casing.

The present invention provides a casing for encasing equipment, comprising a bottom having a drain hole formed therethrough, the drain hole including a first part and a second part having a larger inner diameter than the first part, the second part being open at an underside of the casing.

The above-described casing includes the second part of the drain hole having a larger inner diameter than the first part. The second part of the drain hole is open at the underside of the casing. Consequently, rain water or the like can be prevented from entering the interior of the casing through the drain hole even when pelting against the bottom of the casing together with strong winds such as in a typhoon or rainstorm, or when subjected to a strong wind while flowing along the surface of the casing toward the bottom.

In a preferred form the underside of the casing is formed with a protrusion having a distal end where the second part of the drain hole is open. Since a sufficient depth of the drain hole is ensured, reverse flow of rain water can be prevented more reliably.

BRIEF DESCRIPTION OF THE DRAWINGS

Other objects, features and advantages of the present invention will become clear upon reviewing the following description of a preferred embodiment, made with reference to the accompanying drawings, in which.

DETAILED DESCRIPTION OF THE INVENTION

Figure 1:
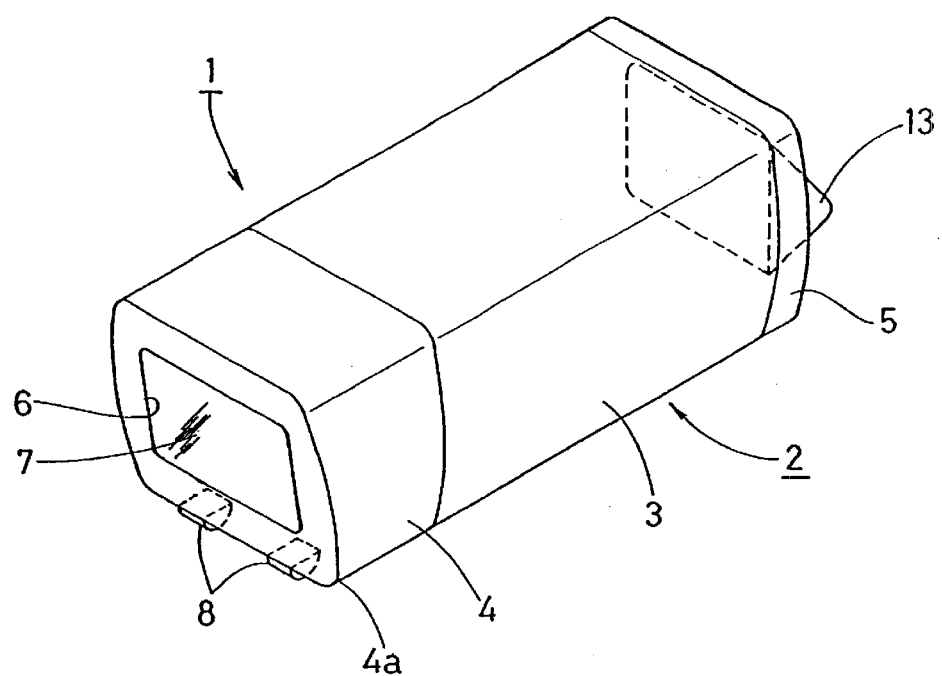
FIG. 1 is a perspective view of a monitoring camera provided with a casing of one embodiment in accordance with the present invention.

An embodiment of the present invention will be described with reference to the accompanying drawings. Referring to FIG. 1, a monitoring camera 1 is schematically shown. The monitoring camera 1 includes a casing 2 in accordance with the present invention. The casing 2 includes a generally rectangular box-shaped casing body 3 having a top, bottom, side walls, front and rear open ends, a front cap 4 made from a synthetic resin and covering the front open end of the body 3 and a rear cap 5 made from a synthetic resin and covering the rear open end of the body 3. The body 3 and caps 4 and 5 are formed by die casting into an integral molding. A monitoring camera body (not shown) is accommodated in the casing body 3.

Figure 2:
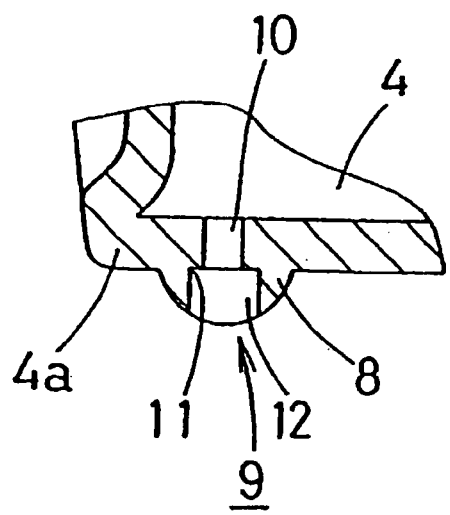
FIG. 2 is an enlarged sectional view of a drain hole.

The front cap 4 has a monitoring window 6 in which a front glass 7 is fitted in a watertight manner. The front cap 4 has two generally semi-cylindrical protrusions 8 formed in juxtaposition on the underside of a front end thereof. The protrusions 8 are formed with drain holes 9 respectively. More specifically, the front cap 4 includes a bottom 4a through which two drain passages 10 extend generally vertically as shown in FIG. 2. Each drain passage 10 serves as a first part of the drain hole 9 and has a bore or inner diameter of 2 mm. Two holes 12 are formed in the protrusions 8 by means of counter boring so as to be continuous to the drain passages 10 respectively. Each hole 12 serves as a second part of the drain hole 9 and has an inner diameter of 4 mm and a depth of 3.2 mm. Thus, each hole 12 has a larger inner diameter than each drain passage 10 and consequently, a stepped portion 11 is formed between each drain passage 10 and the corresponding hole 12. Each hole 12 is open at a distal end or the underside of the corresponding protrusion 8.

A waterproof connector 13 is formed integrally on a rear face of the rear cap 5. A power supply cable, control signal cables, etc. none of which are shown are connected to the waterproof connector 13. Both caps 4 and 5 are fastened to the body 3 by screws (not shown).

A splash-proof test was conducted for the drain holes 9 formed as described above according to the splash-proof type of JIS-C-0920 protection degree 4. This splash-proof type defines the structure which can be prevented from any adverse effect when the structure is subjected to all-way waterdrops. Under this test condition, equipment to be tested is mounted in its regular mode. Water is sprinkled 10±0.5 liter per minute using a watering can which is located 300 to 500 mm above the equipment. Waterdrops cover a range of in total 180 degrees at both sides of an imaginary vertical line extending downward from the can. The equipment is tested for one minute for every outer surface area of 1 m$^2$ and a total test time is at least 5 minutes.

Figure 3:
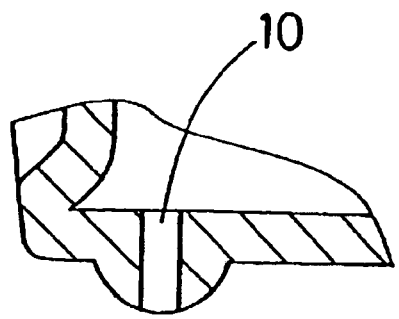
FIG. 3 is an enlarged sectional view of a drain hole formed in a compared product.
Figure 4:
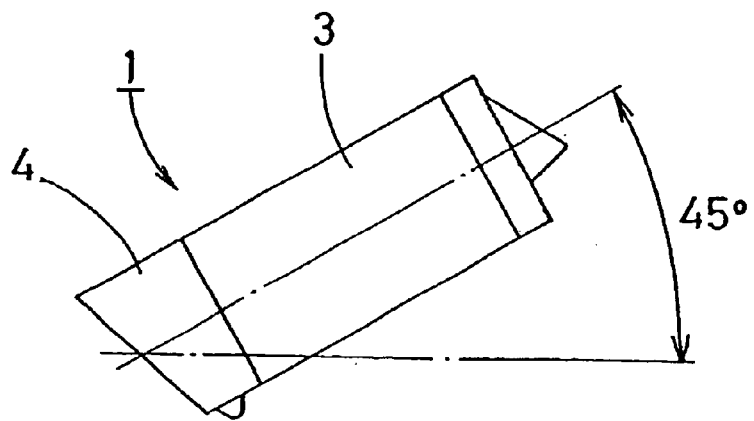
FIGS. 4A and 4B are schematic views of the casing in a splash-proof test.
Figure 4:
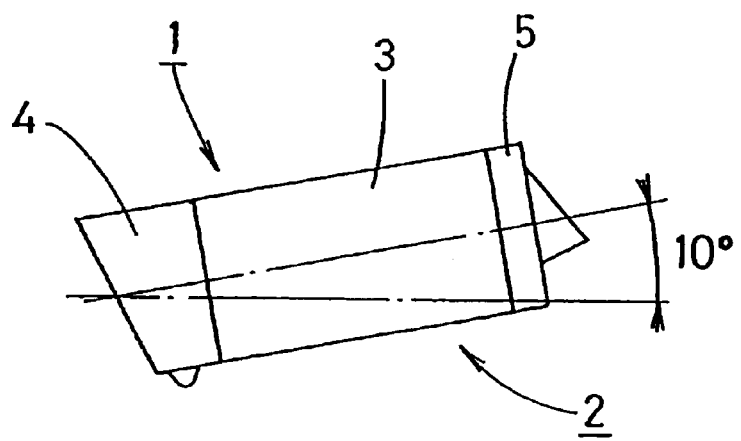

A compared product was prepared. The compared product had the same shape as the foregoing monitoring camera and two drain holes each of which includes a generally straight drain passage with substantially a uniform aperture over its length as shown in FIG. 3. In the splash-proof test, the monitoring camera 1 and the compared product were watered with 11 liters of water using watering cans while being maintained in a forward-tilted state at two tilt angles of 10° and 45° as in FIGS. 4A and 4B. The watering cans were placed 300 mm away from the monitoring cameras so as to assume horizontally forward, horizontally rearward and horizontally lateral positions respectively. Watering from each can was continued for ten minutes.

As the result of the foregoing splash-proof test, no water penetration into the casing 2 was found regarding the monitoring camera 1. On the other hand, water penetration into the casing was found in the casing of the compared product. As obvious from the result of the splash-proof test, each drain passage 10 extends from the bottom 4a of the front cap 4 vertically through the semi-cylindrical protrusion 8. The counter boring is carried out at the underside of the protrusion 8 so that the stepped portion 11 and the hole 12 having a larger inner diameter than the drain passage 10 are formed. The hole 12 is open at the underside of the protrusion 8. Accordingly, the length of the drain path 10 is increased and a sufficient depth of the hole 9 is ensured. Consequently, rain water or the like can reliably be prevented from reverse flow and penetration into the casing 2.

Figure 5:
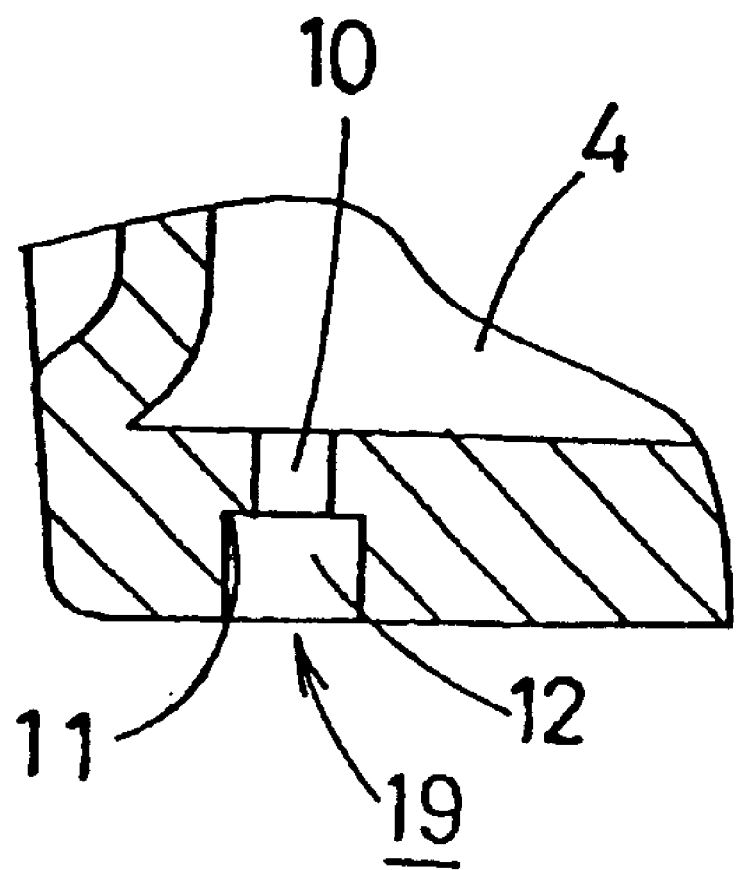
FIG. 5 is an enlarged sectional view of a drain hole of a modified form.

FIG. 5 illustrates a modified form. The casing 2 includes the forward cap 4 having a slightly thickened bottom and a drain hole 19 having the same shape as the drain hole 9. Even in this case, it is easily understood that rain water or the like can reliably be prevented from reverse flow and penetration into the casing 2.

Although the invention is applied to the casing of the monitoring camera in the foregoing embodiment, the invention may be applied to casings for various apparatus, devices and instruments which are installed outdoors.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A casing for encasing a camera, comprising a bottom having a circular drain hole formed therethrough, the drain hole including a first part and a second part having a larger diameter than the first part and coaxial with the first part, the second part being open at an underside of the casing.

2. A casing according to claim 1, wherein the underside of the casing is formed with a protrusion having a distal end where the second part of the drain hole is open.

3. A casing according to claim 1, wherein the drain hole has a stepped portion defined between the first and second parts.

* * * * *